(12) United States Patent
Graziani et al.

(10) Patent No.: US 11,926,082 B2
(45) Date of Patent: Mar. 12, 2024

(54) MOLD FOR MOLDING AN ARTICLE IN TWO MATERIALS

(71) Applicant: GRUPPO MECCANICHE LUCIANI S.R.L., Corridonia (IT)

(72) Inventors: Giordano Graziani, Corridonia (IT); Augusto Pagliari, Corridonia (IT)

(*) Notice: Subject to any disclaimer, the term of this patent is extended or adjusted under 35 U.S.C. 154(b) by 0 days.

(21) Appl. No.: 17/815,012

(22) Filed: Jul. 26, 2022

(65) Prior Publication Data
US 2023/0035328 A1 Feb. 2, 2023

(30) Foreign Application Priority Data
Aug. 2, 2021 (IT) .................... 102021000020822

(51) Int. Cl.
*B29C 45/33* (2006.01)
*B29C 45/00* (2006.01)
*B29C 45/16* (2006.01)
*B29L 31/50* (2006.01)

(52) U.S. Cl.
CPC ........ *B29C 45/1639* (2013.01); *B29C 45/006* (2013.01); *B29C 45/164* (2013.01); *B29C 45/1657* (2013.01); *B29C 45/33* (2013.01); *B29C 2045/0067* (2013.01); *B29C 2045/1659* (2013.01); *B29L 2031/50* (2013.01)

(58) Field of Classification Search
CPC .............. B29C 45/164; B29C 45/1639; B29C 45/0067
See application file for complete search history.

(56) References Cited

U.S. PATENT DOCUMENTS

| | | | |
|---|---|---|---|
| 2003/0214071 A1* | 11/2003 | Ogawa ................ | B29C 45/1635 425/451.7 |
| 2013/0334727 A1* | 12/2013 | Mine ................. | B29C 45/14827 425/552 |

FOREIGN PATENT DOCUMENTS

| | | | |
|---|---|---|---|
| EP | 3964342 A1 * | 3/2022 | |
| EP | 3967471 A1 * | 3/2022 | |
| KR | 20160091103 A | 8/2016 | |

* cited by examiner

*Primary Examiner* — Alison L Hindenlang
*Assistant Examiner* — Debjani Roy
(74) *Attorney, Agent, or Firm* — Egbert, McDaniel & Swartz, PLLC

(57) ABSTRACT

Mold including a first shell having a cavity, a second shell having a projection, and an intermediate shell having a projection suitable for being coupled in the cavity of the first shell and a cavity suitable for being coupled with the projection of the second shell. The second shell includes a first injection channel extending from an inlet hole in a side wall of the second shell to an outlet hole in the projection of the second shell. The intermediate shell has a second injection channel extending from an inlet hole in a side wall of the intermediate shell to an outlet hole in the projection of the intermediate shell.

8 Claims, 9 Drawing Sheets

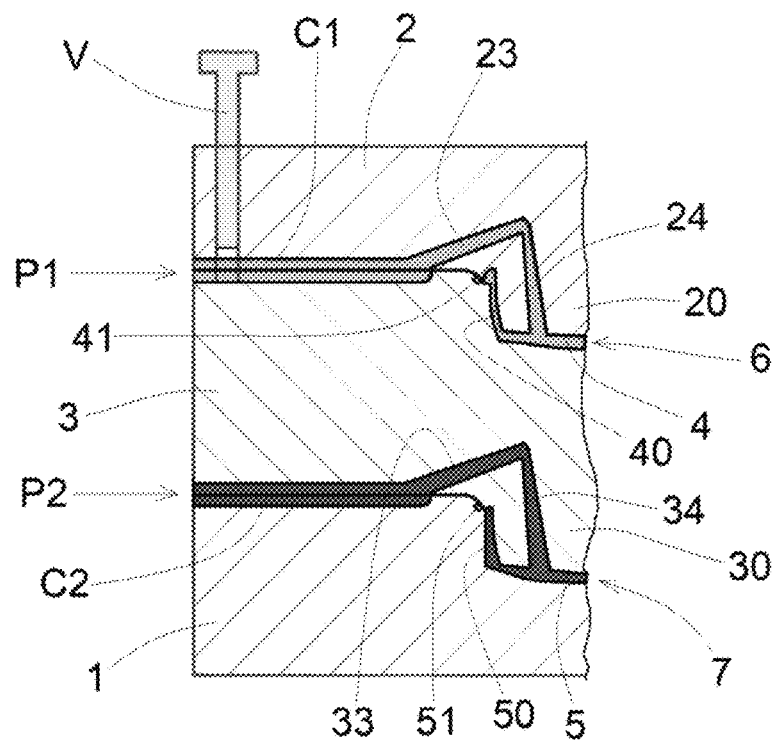
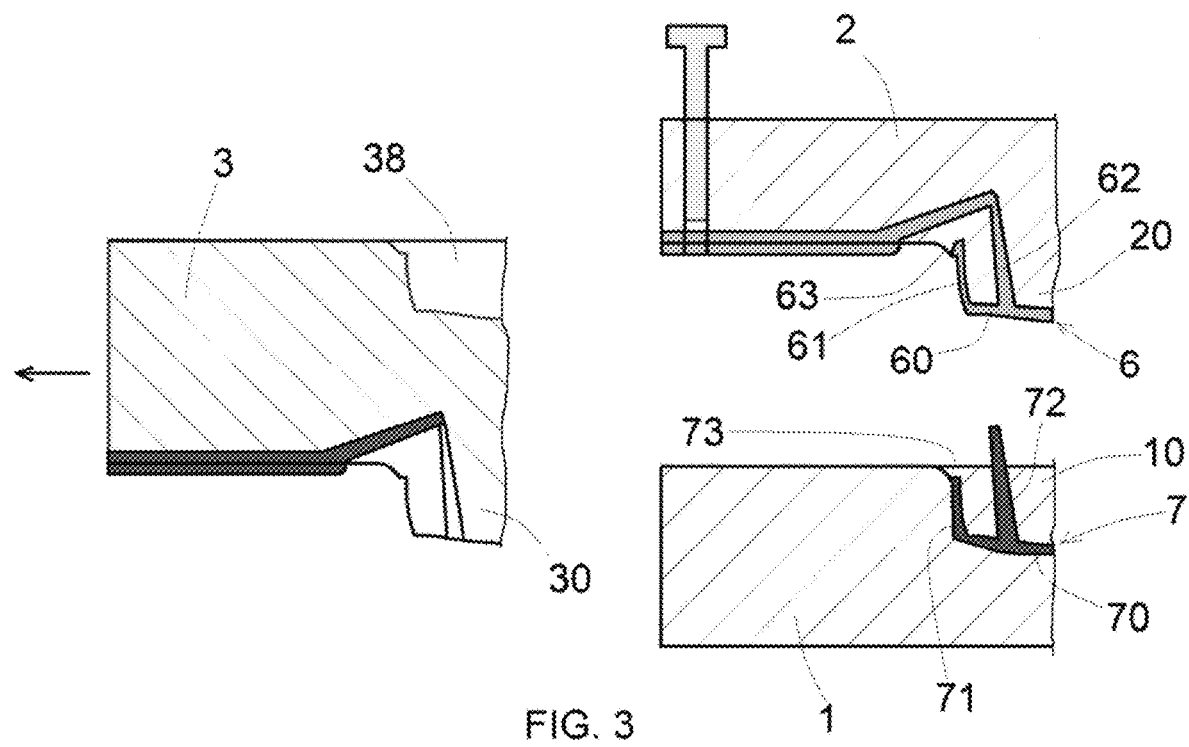
FIG. 2
FIG. 3

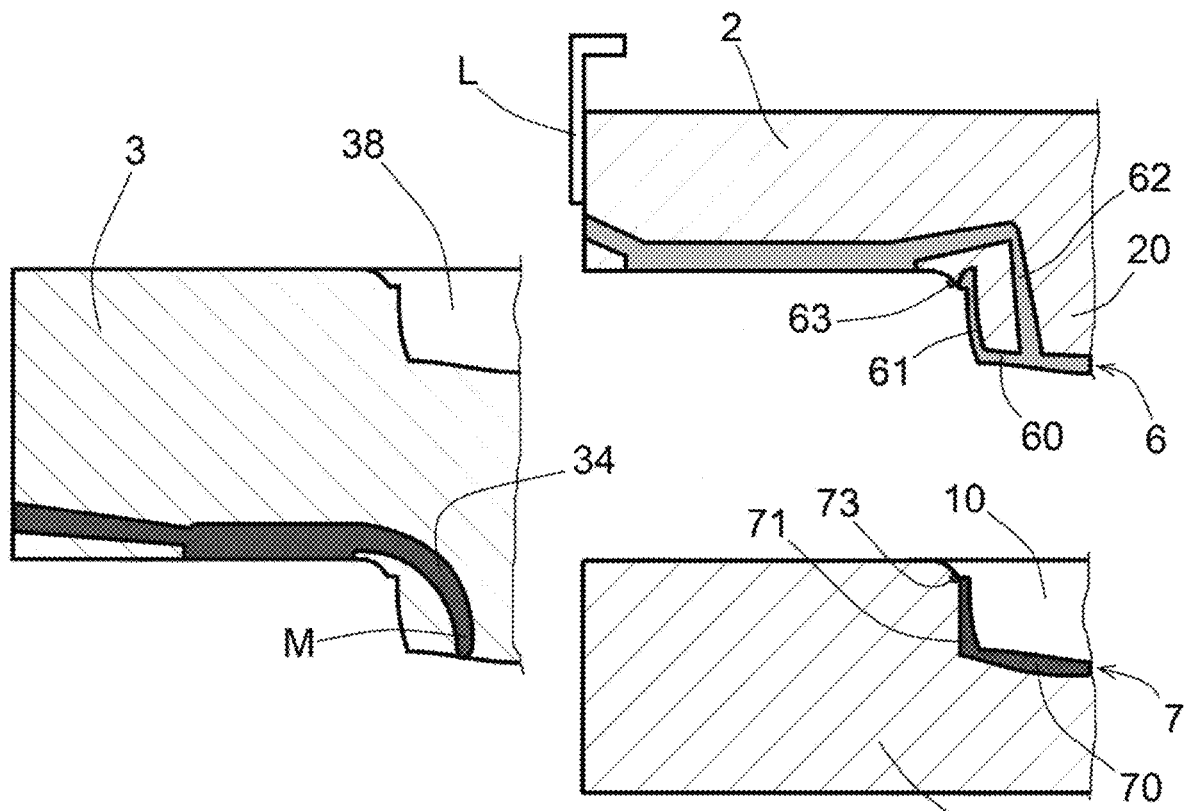
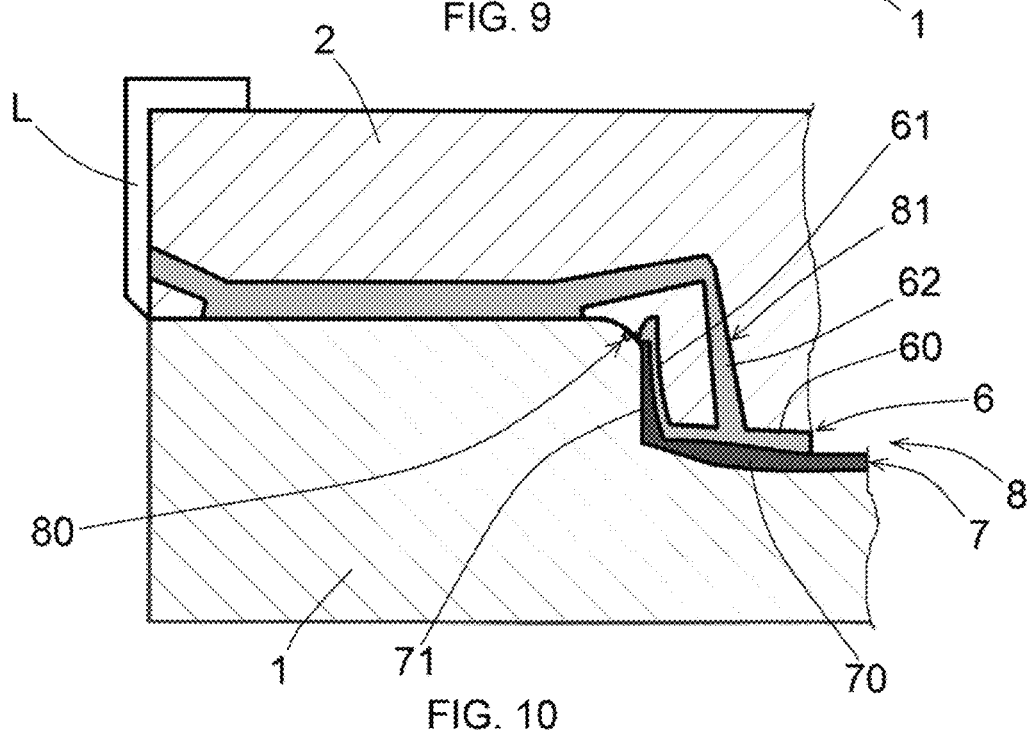
FIG. 9
FIG. 10

MOLD FOR MOLDING AN ARTICLE IN TWO MATERIALS

CROSS-REFERENCE TO RELATED APPLICATIONS

Not applicable.

BACKGROUND OF THE INVENTION

1. Field of the Invention

The present invention relates to a mold for molding an article in two plastic materials, such as for example two plastic materials of different hardness, density, or color and, in particular, to a mold for molding a footwear bottom made of an expandable, cross-linkable plastic material, such as ethyl-vinyl acetate (EVA) or, in any case, with two colors or for molding a footwear bottom with materials of different hardness or density, such as for example a tread with a harder material and a midsole with a softer material.

2. Description of Related Art Including Information Disclosed Under 37 CFR 1.97 and 37 CFR 1.98

Recently, the footwear market has recorded a high demand for footwear bottoms in two colors, which are made by means of injection molding of two plastic materials with different colors. However, problems arise, especially where cross-linkable plastic materials, such as EVA (ethyl vinyl acetate) are used, because such plastic materials are expanded during the cross-linking process, penetrating into each other. As a result, it is not possible to obtain a sharp division line between the two colors, and this is perceived as a production defect. Consequently, the two-color molding process is inefficient as it generates a lot of production waste.

KR20160091103A describes a method for injection foaming molding.

BRIEF SUMMARY OF THE INVENTION

The purpose of the present invention is to eliminate the drawbacks of the prior art by providing a mold for molding articles made of two materials with two colors and/or with different density and/or different hardness that avoids the penetration of the two materials into each other and allows to obtain an article with a sharp division line between the two materials.

Another purpose is to provide a mold that is efficient and suitable for minimizing manufacturing defects and production waste.

Still another purpose is to provide a mold that is versatile and easy to make and use.

These purposes are achieved in accordance with the invention with the features of the appended independent claim 1.

Advantageous achievements of the invention appear from the dependent claims.

BRIEF DESCRIPTION OF THE SEVERAL VIEWS OF THE DRAWINGS

Additional features of the invention will appear clearer from the following detailed description, which refers to a merely illustrative and therefore non-limiting embodiment, illustrated in the appended drawings, wherein:

FIGS. 2, 3 and 4 are partially interrupted sectional views, illustrating the steps of a molding process using the mold of FIG. 1;

FIGS. 8, 9 and 10 are partially interrupted sectional views, illustrating the steps of a molding process using the mold according to the invention of FIG. 7;

DETAILED DESCRIPTION OF THE INVENTION

Figure 1:
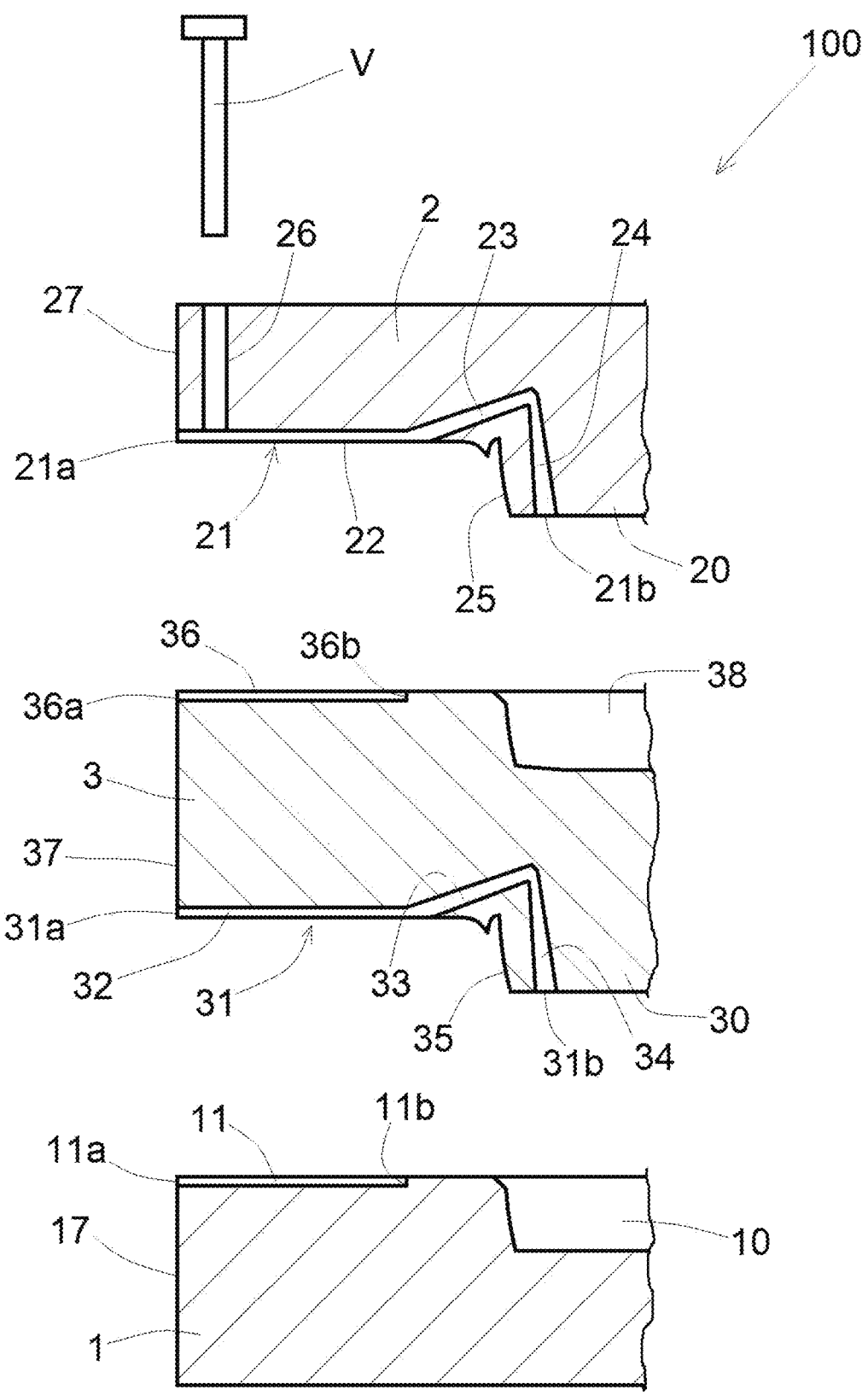
FIG. 1 is a partially interrupted sectional view, illustrating a first mold prototype that is not a part of the invention.

The applicant has devised a first type of mold (100) illustrated in FIG. 1.

The mold (100) comprises:

a first shell (1) having a cavity (10) of a shape and size compatible with a product to be manufactured, a second shell (2) having a projection (20) suitable for being coupled in the cavity (10) of the first shell (1), and an intermediate shell (3) having a projection (30) suitable for being coupled in the cavity (10) of the first shell (1) and a cavity (38) suitable for being coupled with the projection (20) of the second shell (2).

With reference to FIG. 2, when the projection (20) of the second shell is coupled in the cavity (38) of the intermediate shell, a first bottom space (4), a first perimetral space (40) around the first bottom space (4) and a first end space (41) at the end of the perimetral space are generated. When the projection (30) of the intermediate shell is coupled in the cavity (10) of the first shell, a second bottom space (5), a second perimetral space (50) around the second bottom space (5) and a second end space (51) at the end of the perimetral space are generated.

Referring to FIG. 1, the first shell (1) has a groove (11) that is rectilinear and semi-cylindrical in shape, it being obtained in an upper surface of the first shell. The groove (11) of the first shell extends from an inlet (11a) at a lateral end (17) of the first shell to a stop (11b) near the cavity (10) of the first shell, so as not to be in communication with the cavity (10) of the first shell.

The second shell (2) has an injection channel (21) that extends from an inlet hole (21a) at a side wall (27) of the second shell to an outlet hole (21b) on the projection (20) of the second shell, near an edge (25) of the projection.

The first injection channel (21) of the second shell has a first section (22), an intermediate section (23) and a final section (24). The first section (22) is a semi-cylindrical groove on a lower surface of the second shell. The intermediate section (23) is a truncated conical hole obtained in the second shell, with an axis inclined upward with respect to the first section (22). The final section (24) is a truncated conical hole obtained in the projection (20) of the second shell, with a substantially vertical axis.

A closure channel (26) is obtained in the second shell, near the lateral edge (22). The closure channel (26) communicates with the first injection channel (21). A shut-off valve (V) is arranged in the closure channel (26) to close the first injection channel (21) after the plastic material has been injected.

The intermediate shell (3) has an injection channel (31) extending from an inlet hole (31a) at a side wall (37) of the intermediate shell to an outlet hole (31b) on the projection (30) of the intermediate shell, near an edge (35) of the projection.

The second injection channel (31) of the intermediate shell has a first section (32), an intermediate section (33) and a final section (34). The first section (33) is a semi-cylindrical groove on a lower surface of the intermediate shell. The intermediate section (33) is a truncated conical hole obtained in the intermediate shell, with an axis inclined upward with respect to the first section (32). The final section (34) is a truncated conical hole obtained in the projection (30) of the intermediate shell, with a substantially vertical axis.

The intermediate shell has a rectilinear, semi-cylindrical groove (36) obtained on an upper surface of the intermediate shell. The groove (36) of the intermediate shell extends from an inlet hole (36a) at a side wall (37) of the intermediate shell to a stop (36b) near the cavity (38) of the intermediate shell, so as not to communicate with the cavity (38).

Referring to FIG. 2, the first section (22) of the injection channel (21) of the second shell is coupled with the groove (36) of the intermediate shell, so as to generate a first injection duct (C1) of cylindrical shape, suitable for being coupled with injection nozzle for the injection of a first plastic material (P1).

The first section (32) of the injection channel (31) of the intermediate shell is coupled with the groove (11) of the first shell, so as to generate a second injection conduit (C2) of cylindrical shape, suitable for being coupled with an injection nozzle for the injection of a second plastic material (P2).

This description continues by illustrating the two-color molding process.

Referring to FIG. 2, in a first step, the intermediate shell (3) is disposed between the first shell (1) and the second shell (2), and the mold is closed.

A first plastic material (P1) is injected into the first injection duct (C1), and a second plastic material (P2) is injected into the second injection duct (C2). The second plastic material (P2) may have a different color, hardness or density from that of the first plastic material (P1).

The first plastic material (P1) flows into the first injection duct (C1) and enters the first bottom space (4) of the mold, the first perimetral space (40) and the first end space (41) of the mold. In this way, a first semi-manufactured part (6) made of a first plastic material (P1) is generated.

Similarly, the second plastic material (P2) flows into the second injection duct (C2) and enters the second bottom space (5), the second perimetral space (50) and the second end space (51) of the mold. This generates a second semi-manufactured part (7) made of a second plastic material (P2).

With reference to FIG. 3, the mold (100) is opened and the intermediate shell (3) is extracted from the mold. The first semi-manufactured part (6) remains in the second shell (2), and the second semi-manufactured part (7) remains in the first shell (1).

The first semi-manufactured part (6) has a bottom wall (60) formed in the first bottom space (4), a perimetral wall (61) formed in the first perimeter space (40), a semi-burr (63) formed in the first end space (41), and a projection (62) with a truncated conical shape formed in the final section (24) of the injection channel of the second shell. The perimetral wall (61) rises from the bottom wall (60) and surrounds the bottom wall. The semi-burr (63) protrudes from the perimetral wall (61). The projection (62) rises from the bottom wall, near the perimetral wall (61).

The second semi-manufactured part (7) has a bottom wall (70) that was formed in the second bottom space (5), a perimetral wall (71) that was formed in the second perimetral space (50), a semi-burr (73) that was formed in the second end space (51), and a projection (72) of truncated conical shape, which was formed in the final section (34) of the injection channel of the intermediate shell. The perimetral wall (71) rises from the bottom wall (70) and surrounds the bottom wall. The semi-burr (73) protrudes from the perimetral wall (71). The projection (72) rises from the bottom wall, close to the perimetral wall (71).

Figure 4:
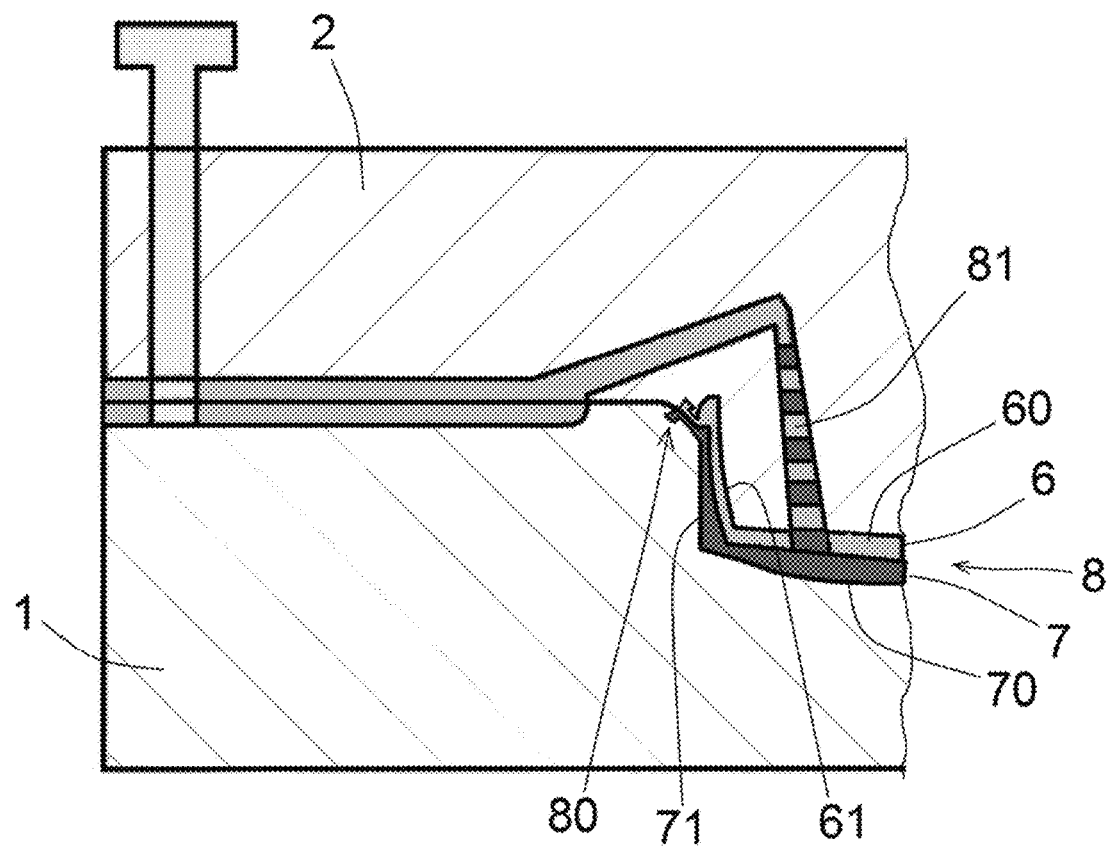
Figure 4A:
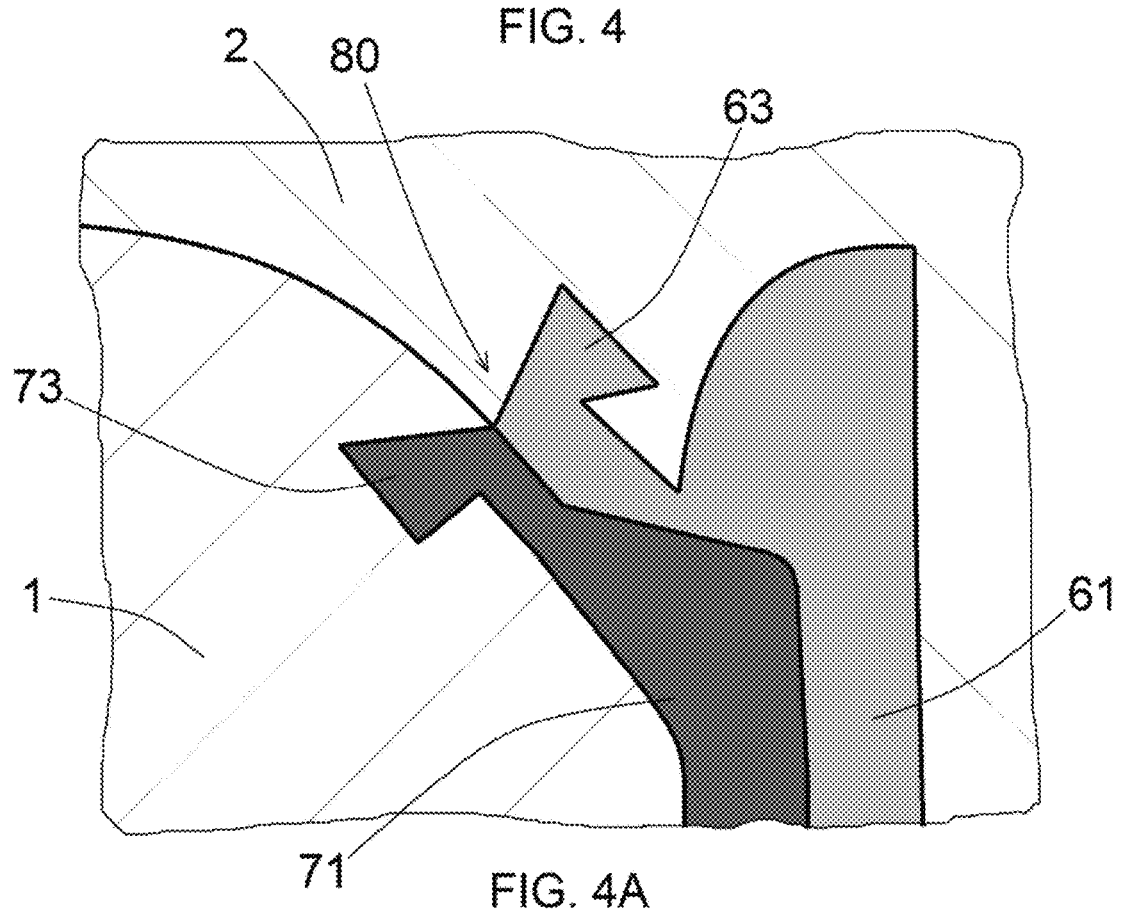
FIG. 4A is an enlarged detail of FIG. 4.

With reference to FIG. 4, in a second step, the mold is closed, and the projection (20) of the second shell is coupled in the cavity (10) of the first shell. In this way, the bottom wall (60) of the first semi-manufactured part goes in contact with the bottom wall (70) of the second semi-manufactured part, the perimetral wall (61) of the first semi-manufactured part goes in contact with the perimetral wall (71) of the second semi-manufactured-part, and the semi-burr (63) of the first semi-manufactured part goes in contact with the semi-burr (73) of the second semi-manufactured part, forming a perimetral burr (80) suitable for being removed. The projection (72) of the second semi-manufactured part penetrates in the projection (62) of the first semi-manufactured part, forming a portion of sprue (81) suitable for being removed.

The role of the perimetral burr (80) is critical in holding the two semi-manufactured parts (6, 7) perfectly in place during the closure of the mold and creating a sharp division between the two materials (P1, P2) throughout the perimeter of the product.

The mold is kept closed for about 400 to 500 seconds depending on the size of the product to be molded, at a temperature of about 160 to 190° C. During this second molding step, the cross-linking and the expansion of the two plastic materials (P1, P2) of the two semi-manufactured parts (6, 7) take place; then the two semi-manufactured parts (6, 7) are joined together, forming a single product (8) made of two different materials (P1, P2).

Successively, the perimetral burr (80) and the portion of sprue (81) are removed.

Figure 5:
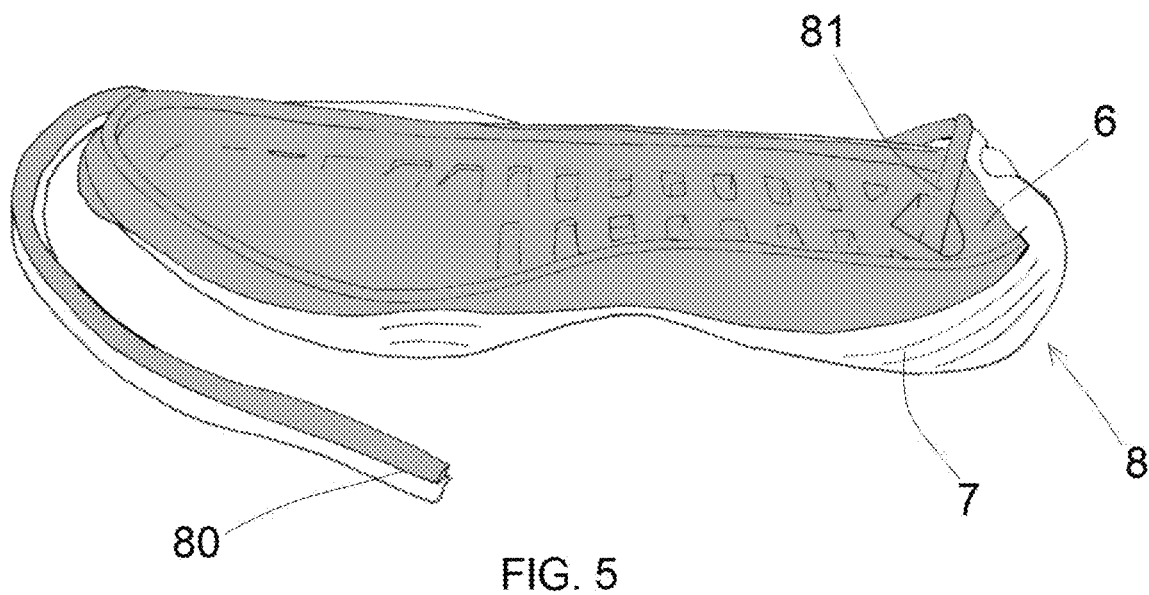
FIG. 5 is a photograph of a footwear bottom with a partially removed perimetral burr.

FIG. 5 illustrates a product (8) consisting of a footwear bottom obtained from two semi-manufactured parts (6, 7) of different colors, wherein the perimetral burr (80) has been partially removed.

It should be considered that during molding, the shells (1, 2, 3) are heated to high temperatures of about 160-190° C. Generally speaking, the shells (1, 2, 3) are made of aluminum. As it is well known, at a temperature of 190° C., aluminum is subject to thermal expansion. Because of thermal expansion, the shells (1, 2, 3) no longer match perfectly in length, width and height. Thermal expansion creates the imperfect closure between the parts of the mold. Such imperfect closure negatively affects a vacuum creation in the mold cavities.

In the first molding step, projections (62, 72) are created as dripping of excess residual material at the final sections (24, 34) of the injection channels.

In the second molding step, the portion of sprue (81) is created due to the uncontrolled mixing of the plastic materials (P1, P2) of the two projections (62, 72). Such an uncontrolled mixing of the two plastic materials (P1, P2)

from the portion of sprue (81) is transmitted onto the product (8), inevitably generating imperfections.

Figure 6:
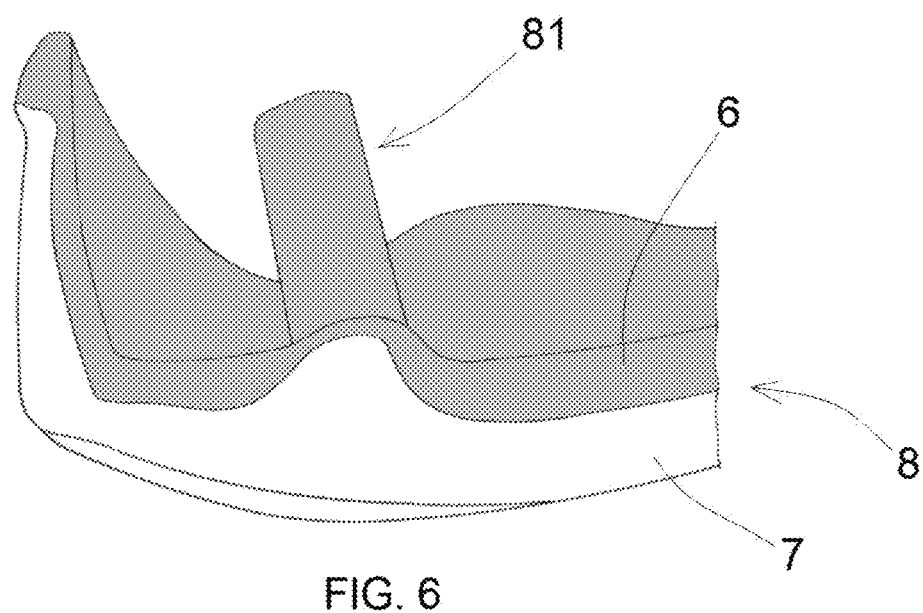
FIG. 6 is a photograph of a part of footwear bottom illustrating a portion of sprue.

FIG. 6 illustrates a product (8) obtained with two semi-manufactured parts (6, 7) of different colors, wherein there is a prevalence of the color of the second semi-manufactured part (7) in the portion of sprue (81). Therefore, a sharp division line between the two materials of different color is not obtained.

Another issue is due to the fact that during the first molding step, air must be removed from inside the mold with a vacuum pump to eliminate additional defects in the outer surfaces of the product (8), such as burns and air bubbles created by the presence of air in the spaces of the mold.

In order to create a vacuum inside the mold, it is necessary that the contact surfaces between the first shell, the intermediate shell and the second shell are perfectly matched. However, this is impossible to achieve, both because the surfaces are not flat but have curvatures and because of the different thermal expansion of the components of the mold, due to different temperatures between the first shell (1), the intermediate shell (3) and the second shell (2). There can be temperature differences of approximately 90° between the intermediate shell (3) and the first and second shell (1, 2) and temperature differences of approximately 170° C. between the first shell (1) and the second shell (2). In view of the above, the surfaces of the shells do not match in the proximity of the curvatures.

In addition to the surplus of plastic material created in the portion of sprue (80) during cross-linking, an additional problem due to the temperatures of the mold was noted. In fact, an excessive temperature of the intermediate shell (3) at the end of the first molding step, causes the cross-linking of the semi-manufactured parts (6, 7) to begin when the mold is opened, before the second molding step. This creates bulges in the semi-manufactured parts (6, 7). Therefore, when the mold is closed, imperfections are created in the coupling area between the two semi-manufactured parts (6, 7).

EVA is molded in a press having an upper and lower plate heated to a temperature of 160 to 190° C. The heated plates of the press are in contact with the first and second shell (1, 2) of the mold. Then the intermediate shell (3) is cooled to a temperature of about 90° when it is in vertical lateral position out of the press during cross-linking. In fact, if the intermediate shell was not cooled, when the intermediate shell comes into contact with the first and the second shell (1, 2) during the successive molding step, the intermediate shell would reach too high a temperature that generates a premature baking of the plastic material and consequently a deformation of the two half-manufactured parts (6, 7) that are to be coupled successively.

Figure 7:
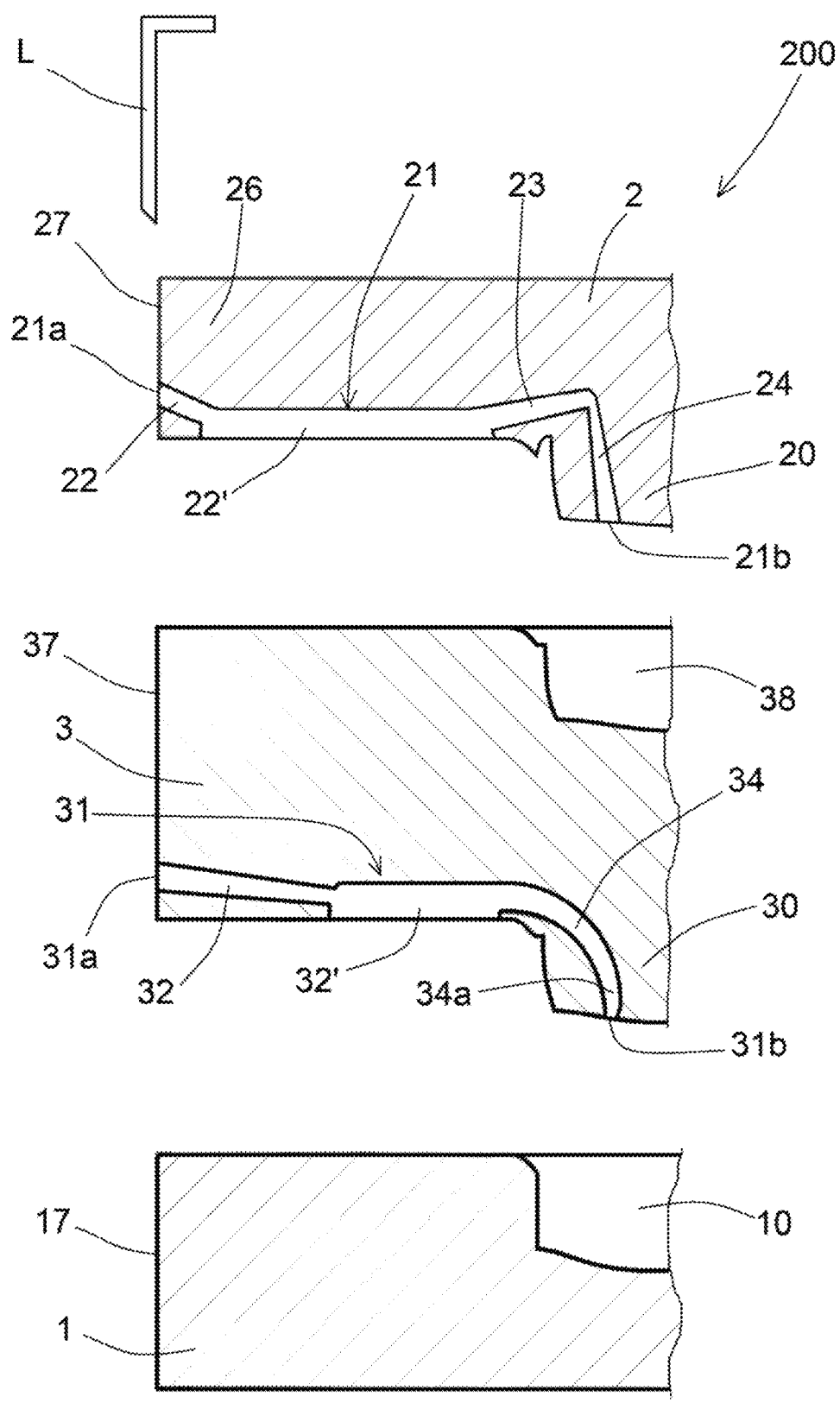
FIG. 7 is a partially interrupted sectional view, illustrating a mold according to the invention.

With reference to FIG. 7, a mold (200) according to the invention is illustrated, wherein elements equal or corresponding to those already described are indicated with the same reference numbers, omitting their detailed description.

The second shell (2) of the mold (200) has a first injection channel (21) different from the first injection channel of the second shell of the mold (100).

The first injection channel (21) of the second shell (2) of the mold (200) extends from an inlet hole (21a) in a side wall (27) of the second shell to an outlet hole (21b) in the projection (20) of the second shell.

The first injection channel (21) of the second shell (2) of the mold (200) includes a first section (22), a second section (22'), a third section (23) and a final section (24).

The first section (22) is a truncated conical hole, with increasing diameter towards the interior of the mold, which is obtained in the second shell (2).

The second section (22') is a rectilinear, semi-cylindrical groove on the lower surface of the second shell.

The third section (23) is a truncated conical hole with increasing diameter towards the second section (22'), which is obtained in the second shell (2) with an axis inclined upward, relative to the second section (22').

The final section (24) is a truncated conical hole with a substantially vertical axis.

The first truncated section (22), which is larger towards the interior of the mold, has a downward inclined axis relative to the second section (22').

In such a case, there is no closure channel running through the second shell, otherwise the first section (22) of the injection channel would remain dirty. In order to contain the plastic material during cross-linking, a closure blade (L) is used instead of the shut-off valve, sliding outside the second shell, on the side wall (27) of the second shell, to close the inlet hole (21a) of the first injection channel (21) during the cross-linking of the plastic material in the first injection channel (21).

The intermediate shell (3) of the mold (200) has a different injection channel (31) from the injection channel of the intermediate shell of the mold (100).

The second injection channel (31) of the intermediate shell (3) of the mold (200) extends from an inlet hole (31a) in a side wall (37) of the intermediate shell to an outlet hole (31b) in the projection (30) of the intermediate shell.

The second injection channel (31) of the intermediate shell (3) of the mold (200) comprises a first section (32), a second section (32') and a final section (34).

The first section (32) is a truncated conical hole with increasing diameter toward the interior of the intermediate shell (3).

The second section (32') is a rectilinear, semi-cylindrical groove on the lower surface of the intermediate shell (3).

The final section (34) is a conduit with curved and tapered shape, obtained in the projection (30) of the intermediate shell.

The final section (34) is shaped like an arc of a circle, for instance like an arc of a circle subtended by a 90° angle. Said final section (34) has a tapered lower end portion, with decreasing diameter to form a narrowing (34a) in the outlet hole (31b) of the injection channel. Such a narrowing (34a) causes a break in the excess material contained in the final section (34) of the injection channel.

Figure 8:
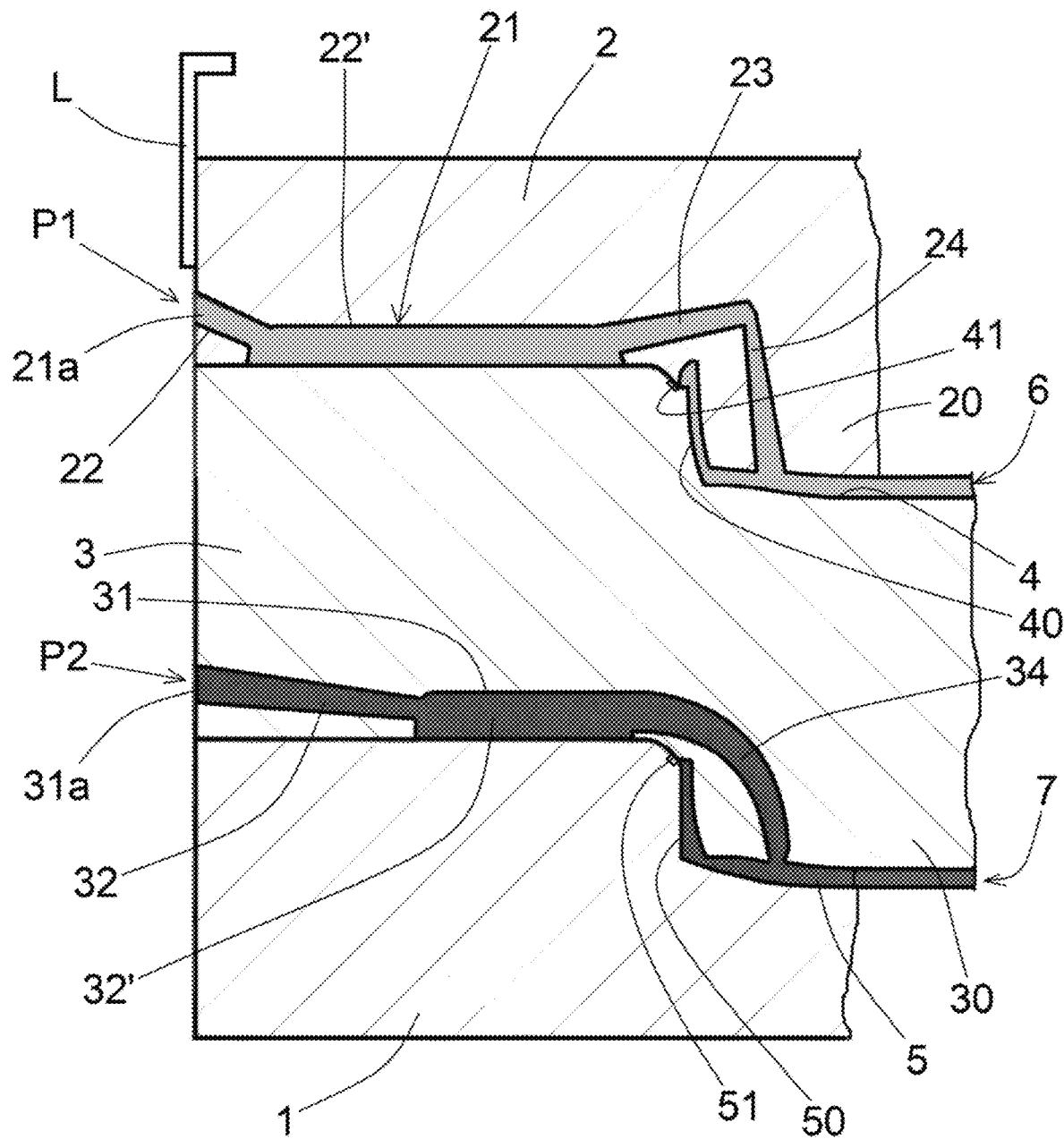

It should be noted that when the mold is closed, as shown in FIG. 8, the second section (22') of the injection channel (21) of the second shell is arranged on the upper surface of the intermediate shell (3), without having to be coupled with a semi-cylindrical groove of the intermediate shell.

Similarly, the second section (32') of the injection channel (31) of the intermediate shell is arranged on the upper surface of the first shell, without having to be coupled with a semi-cylindrical groove of the first shell.

The coupling of the injection nozzles of the press with the mold is ensured by the fact that the first sections (22, 32) of the injection channels (21, 31) of the second shell and of the intermediate shell are larger truncated conical conduits from the inner side, respectively obtained in the second shell (2) and in the intermediate shell (3).

Referring to FIG. 8, the first molding step provides for injecting the first plastic material (P1) and the second plastic material (P2) into the injection channel (21) of the second shell and the injection channel (31) of the intermediate shell, respectively. The first plastic material (P1) flows into the first bottom space (4), the first perimetral space (40) and the end space (41), forming the first semi-manufactured part (6). The second plastic material (P2) flows into the second bottom space (5), the second perimetral space (50) and the second end space (51), forming the second semi-manufactured part (7).

Referring to FIG. 9, when the intermediate shell (3) is extracted, the first semi-manufactured part (6) remains in the second shell (2) and the second semi-manufactured part (7) remains in the first shell (1).

The first semi-manufactured part (6) has a bottom wall (60), a perimetral wall (61), a semi-burr (63) and a projection (62) with truncated conical shape. The second semi-manufactured part (7) has a bottom wall (70), a perimetral wall (71) and a semi-burr (73). It should be noted that the second semi-manufactured part (7) has no projection of truncated conical shape, precisely because the final section (34) of the injection channel of the intermediate shell has an arched shape, therefore the excess plastic material (M) remains in the final section (34) of the injection channel of the intermediate shell, and thus no projection is formed on the bottom wall (70) of the second shell.

Figure 10A:
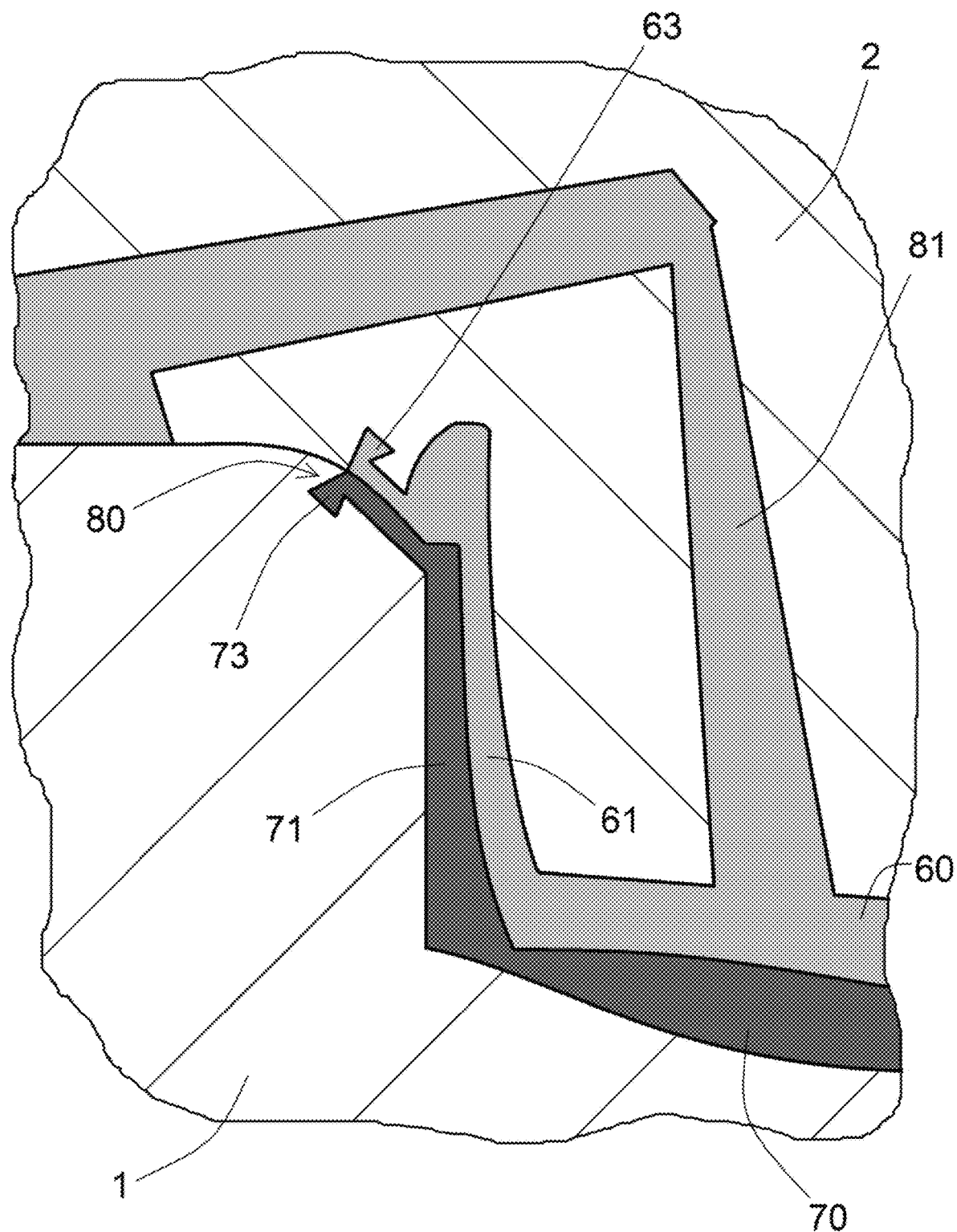
FIG. 10A is an enlarged detail of FIG. 10.

Referring to FIG. 10, in the second cross-linking step of the plastic material, the bottom wall (60) of the first semi-manufactured part goes in contact with the bottom wall (70) of the second semi-manufactured part, the perimetral wall (61) of the first semi-manufactured part goes in contact with the perimetral wall (71) of the second semi-manufactured part and the semi-burr (63) of the first semi-manufactured part goes in contact with the semi-burr (73) of the second semi-manufactured part, forming a perimetral burr (80) (FIG. 10A) suitable for being removed.

It should be noted that the second semi-manufactured part has no projection (72) penetrating in the projection (62) of the first semi-manufactured part. Therefore, in such a case, the portion of sprue (81) is formed only by the projection (62) of the first semi-manufactured part. Since there is no penetration of material in the projection (62) of the first semi-manufactured part, the portion of sprue (81) is formed only by the first plastic material (P1). Therefore, when the portion of sprue (81) is removed, no defect is noted due to penetration and fusion between the two plastic materials, and no excess material, which would create defects in the product, is created.

Figure 11:
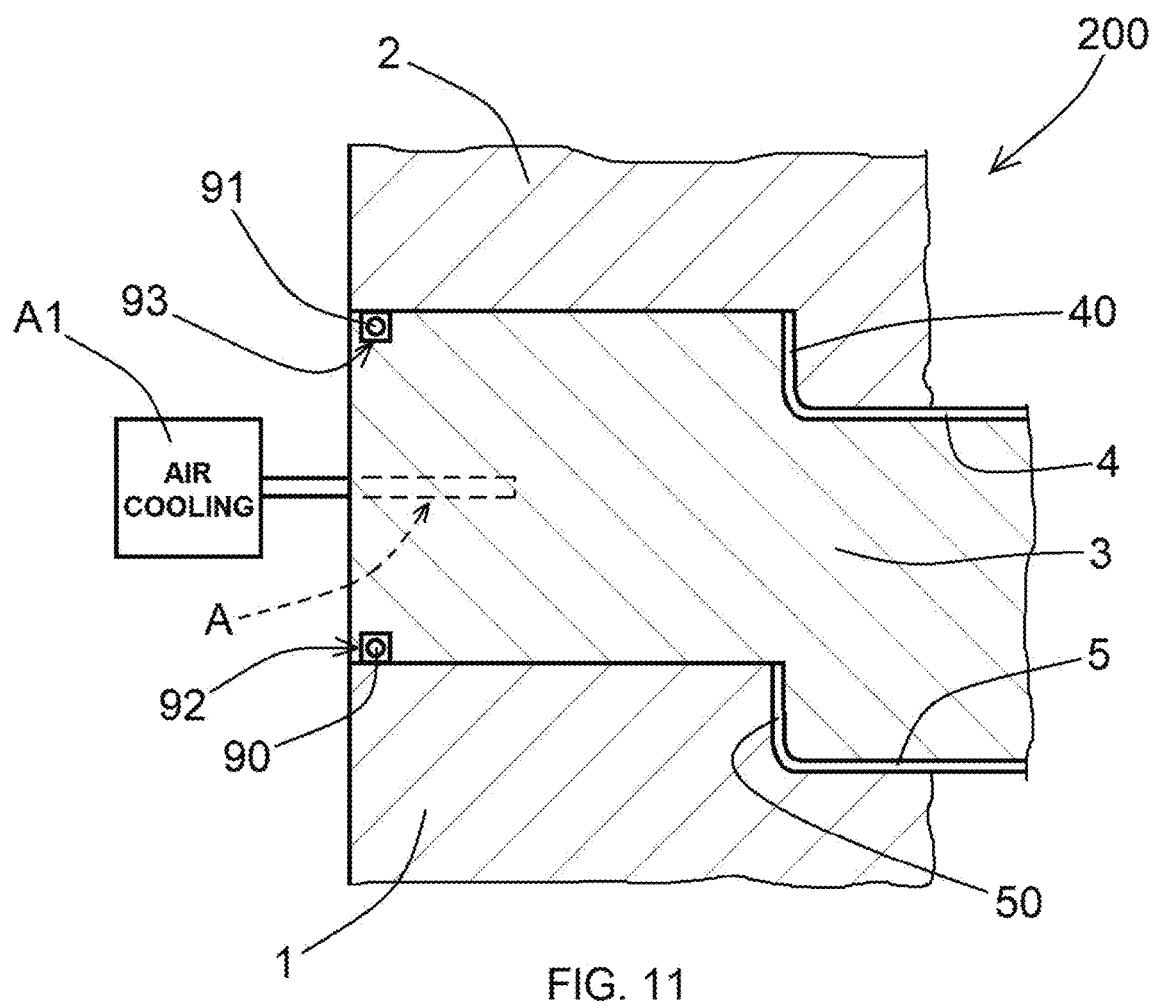
FIG. 11 is a partially interrupted sectional view, illustrating a portion of the mold according to the invention.

With reference to FIG. 11, in the mold (200) according to the invention, the problem of different thermal expansion due to different temperatures between the shells (1, 2, 3) was solved with a first seal (90) and a second seal (91) made of silicone mixture, which withstand a temperature up to 300° C. The seals (90, 91) are used to close the three parts of the mold and ensure an air seal during the creation of vacuum in the molding step. The first seal (90) is inserted into a groove (92) between the first shell (1) and the intermediate shell (3). The second seal (91) is inserted into a groove (94) between the intermediate shell (3) and the second shell (2). This compensates for the imperfections created by the temperature difference between the first and second shell and the intermediate shell of the mold, creating a seal between the three shells of the mold, which is used for the extraction of air with a pump to create vacuum inside the mold.

In the mold (200) according to the invention, in order to overcome the problem of early cross-linking of the plastic material in the first molding step, an air cooling circuit (A) is provided in the intermediate shell (3). The cooling circuit (A) is connected to an air cooling system (A1), which is controlled during the idle step of the intermediate shell (3). When the intermediate shell (3) is moved away sideways, through the air cooling system (A1), the temperature of the intermediate shell is stabilized at a temperature of about 90 to 100° C. Such a solution ensures that the intermediate shell does not reach too high a temperature in the first molding step, creating problems due to early cross-linking.

The mold (200) according to the invention solves all the problems of the prior art.

The injection channels (21, 31) are made only in the second shell (2) and in the intermediate shell (3), are perfectly separated and are suitably configured to avoid any residue in the cavities of the mold that would get the finished product dirty due to the mixing of the two materials (P1, P2). In particular, the portion of sprue (81) is formed only on the first semi-manufactured part (6), whereas no portion of sprue is formed on the second semi-manufactured part (7), in such a way that there is no mixing of material between portions of sprues.

The external closure system of the first injection channel (21) of the second semi-shell is provided with an external blade (L) with flat shape that acts outside the second semi-shell, so as not to interrupt the sprue in the first injection channel (21), which would otherwise remain in the first section (22) of the injection channel, without cross-linking, getting the mold dirty.

The seal (90), which are arranged peripherally on an upper and lower surface of the intermediate shell (3), make up for imperfections of shaped profiles of the shells of the mold that undergo different thermal expansion due to different temperatures. This provides a perfect closure between the three shells of the mold, which ensures a creation of vacuum in the cavities of the mold.

The air cooling circuit (A) inside the intermediate shell (3) is essential to bring the intermediate shell from a temperature of about 180° reached after molding to a temperature of 90-100° C. to avoid the cross-linking of the plastic material during the first molding step.

Equivalent variations and modifications may be made to the present embodiment of the invention, within the reach of an expert of the field, but still within the scope of the invention as expressed by the appended claims.

We claim:
1. A mold assembly comprising:
   a first shell having a cavity, the cavity adapted to have a size and a shape compatible with a product;
   a second shell having a projection coupleable in the cavity of said first shell;
   an intermediate shell having a projection coupleable in the cavity of said first shell, said intermediate shell having a cavity couplable with the projection of said second caulking, wherein a first bottom space and a first perimetrical space are generated when the projection of said second shell coupled in the cavity of said intermediate shell, the first perimetrical space extending around the first bottom space, wherein a second bottom space and a second perimetrical space are generated when the projection of said intermediate shell is coupled in the cavity of said first shell, the second perimetrical space extending around the second bottom space, wherein said second shell has a first injection channel extending from an inlet hole in a side wall of said second shell to an outlet hole in the projection of said second shell so as to communicate with the first bottom space and adapted so as to allow a first plastic material to be injected in the first bottom space in order to obtain a first semi-manufactured part, wherein said intermediate shell has a second injection channel extends from an inlet hole in a side wall of said intermediate shell to an outlet hole of said intermediate shell so as to communicate with the second bottom space and is adapted to allow a second plastic material to be injected in the second bottom space so as to obtain a second semi-manufactured part, the second plastic material being of a color different than a color of the first plastic material, wherein the first injection channel is formed only in said second shell and the second injection channel is formed only in said intermediate shell, wherein said intermediate shell is removable so as to leave the first semi-manufactured part on said second shell with no portion of a sprue and to leave the second semi-manufactured red part on said first shell with a portion of the sprue, wherein said first shell and said second shell are couplable to each other and adapted to join the first semi-manufactured part to the second semi-manufactured part in order to obtain an article of different colors, wherein a first end space is generated in a projection position from the first perimetrical space when the projection of said second shell is coupled in the cavity of said intermediate shell so as to form a semi-burr of the first semi-manufactured part, wherein a second end space is generated in a projection position from the second perimetrical space when the projection of said intermediate shell is coupled in the cavity of said first shell so, as to form a semi-burr of the second semi-manufactured part, wherein the semi-burr of the first semi-manufactured part and the semi-burr of the second manufactured part are melted together when said first shell is coupled to said second shell so as to form a perimetrical burr; and a closing blade that is slidable outside said second shell on a side wall of said second shell, so as to close the inlet hole of the first injection channel during a cross-linking of the plastic material inside the first injection channel.

2. The mold assembly of claim 1, wherein said first injection channel comprises:
a first sect on having a truncated conical hole in said second shell;
a second section having a rectilinear semi-cylindrical groove on a lower surface of said second shell;
a third section having a truncated conical hole in said second shell with an upwardly inclined axis relative to said second section; and
a final section having a truncated conical hole with a substantially vertical axis.

3. The mold assembly of claim 1, wherein the second injection channel of said intermediate shell comprises;
a first section hawing a truncated conical hole in said intermediate shell;
a second section having a rectilinear semi-cylindrical groove on a lower surface of said intermediate shell; and
a final section having a duct with a curved tapered shape formed in the projection of said intermediate shell.

4. The mold assembly of claim 1, further comprising:
a first seal disposed in a groove between said first shell and said intermediate shell; and
a second seal disposed in a groove between said intermediate shell and said second shell.

5. The mold assembly of claim 1, wherein said intermediate shell has an air cooling circuit arranged inside said intermediate shell, the air cooling circuit adapted to connect to an air cooling system and controlled so as to stabilize to temperature of said intermediate shell to approximately 90° C. to 100° C.

6. The mold assembly of claim 2, wherein said first section of the first injection channel of said second shell has a downwardly inclined axis relative to said second section.

7. The mold assembly of claim 3, wherein said first section of the second injection channel of said intermediate shell has a downwardly inclined axis relative to the second section of the second injection channel of said intermediate shell.

8. The mold assembly of claim 3, wherein said final section of the second injection channel of said intermediate shell has a lower tapered end portion with a decreasing diameter so as to form a narrowing corresponding to the outlet hole of said second injection channel.

* * * * *